United States Patent [19]

Nishikawa et al.

[11] Patent Number: 4,680,928
[45] Date of Patent: Jul. 21, 1987

[54] WARM-UP PROMOTION DEVICE FOR AUTOMATIC TRANSMISSION

[75] Inventors: Masao Nishikawa, Tokyo; Takashi Aoki, Fujimi, both of Japan

[73] Assignee: Honda Giken Kogyo Kabushiki Kaisha, Tokyo, Japan

[21] Appl. No.: 508,036

[22] Filed: Jun. 27, 1983

[30] Foreign Application Priority Data

Jul. 3, 1982 [JP] Japan .................... 57-115680

[51] Int. Cl.⁴ .............................. F16D 31/00
[52] U.S. Cl. ...................... 60/329; 60/337; 192/3.28
[58] Field of Search .......... 60/337, 330, 329; 192/3.28, 3.29, 3.30, 3.31, 3.32, 3.33, 113 B; 74/731, 732, 733

[56] References Cited

U.S. PATENT DOCUMENTS

| | | | |
|---|---|---|---|
| 3,063,245 | 11/1962 | Rippy | 60/337 |
| 3,774,734 | 11/1973 | Forster et al. | 60/337 |
| 3,951,242 | 4/1976 | Fischer et al. | 60/337 X |
| 4,096,693 | 6/1978 | Kawamoto | 60/337 |
| 4,209,985 | 7/1980 | Master | 60/337 |
| 4,458,720 | 7/1984 | Gierer | 192/3.31 |
| 4,597,482 | 7/1986 | Sakurai et al. | 192/3.31 |

FOREIGN PATENT DOCUMENTS

| | | | |
|---|---|---|---|
| 0004967 | 1/1977 | Japan | 60/337 |
| 671581 | 5/1952 | United Kingdom . | |
| 847742 | 9/1960 | United Kingdom . | |
| 896195 | 5/1962 | United Kingdom . | |

Primary Examiner—Edward K. Look
Attorney, Agent, or Firm—Armstrong, Nikaido, Marmelstein & Kubovcik

[57] ABSTRACT

An automatic transmission has a torque convertor, an inlet passage connecting between an oil inlet of the torque convertor and an outlet of a hydraulic pump driven by an engine, and an outlet passage connecting between an oil outlet of the torque convertor and an oil tank, the outlet passage being provided at its intermediate portion with an oil cooler. The warming up of the transmission after start up in a cold state is promoted by a warm-up promotion device which comprises a by-pass passage branched from the outlet passage at a portion upstream of the oil cooler and leading to the oil tank, and a by-pass valve associated with the by-pass passage and adapted to open the by-pass passage during warming up of the automatic transmission.

2 Claims, 5 Drawing Figures ively or after passing through essential lubricating parts of the automatic transmission. This system operates without any problem under normal condition of use, but still suffers from the following disadvantages to be overcome in the operation immediately after start up of the engine in cold district.

WARM-UP PROMOTION DEVICE FOR AUTOMATIC TRANSMISSION

BACKGROUND OF THE INVENTION

The present invention relates to a warm-up promotion device for automatic transmission of the type having a torque convertor, an inlet passage connecting between the oil inlet of said torque convertor and the outlet of a hydraulic pump driven by an engine, and an outlet passage connecting between the oil outlet of the torque convertor and an oil tank, the outlet passage being provided therein with an oil cooler.

In a vehicle mounting an automatic transmission of the type described, a considerable heat is produced in the torque convertor due to a slip in the latter, so that the oil discharged from the torque convertor is cooled by an oil cooler and returned to an oil tank directly or after passing through essential lubricating parts of the automatic transmission. This system operates without any problem under normal condition of use, but still suffers from the following disadvantages to be overcome in the operation immediately after start up of the engine in cold district.

Namely, the oil temperature is not raised sufficiently within a period of several minutes after the start up of engine so that the oil exhibits a large viscosity to increase the resistance in sliding parts, resulting in a power loss and a consequent increase of the fuel consumption. This applies also to rubber parts of oil seals used for keeping oiltight seals on every rotating parts. Namely, the rubber parts of the oil seals in cold state increases the sliding resistance.

In cold districts, it is often experienced that this unfavourable state continues for more than ten minutes. It is a current tendency that the torque convertors of automatic transmissions are used in a "direct connection" condition to reduce the fuel consumption. In such type of automatic transmission, the heat output from the torque convertor is so small that the above-described problem is serious and, therefore, there is a demand for a suitable measure for promoting the warming up of the automatic transmission.

The mechanism for direct connection of the torque convertor is broadly sorted into two types: namely, a first type in which the control is made by making use of the internal pressure of the torque convertor, and a second type in which the control is made by the difference of pressure between the internal pressure of the torque convertor and a separately supplied hydraulic pressure. In either type, the internal pressure of the torque convertor is an important factor for determining the connecting power of the direct connection mechanism. From this point of view, it is necessary that the internal pressure of the torque convertor should be made as free as possible from the influences of other factors. In the conventional automatic transmissions, particularly in those used in a cold district, however, the resistance against the flow of oil is increased as the ambient temperature comes down in the oil cooler located downstream of the torque convertor and in other pipes or conduits associated with lubricating parts. In consequence, the internal pressure of the torque convertor is increased to impair the accomplishment of the initial design of the automatic transmission.

SUMMARY OF THE INVENTION

Under this circumstance, the present invention aims as its primary object at providing a warm-up promotion device for automatic transmission, wherein a by-pass passage is branched from the outlet passage leading from the torque convertor at the upstream side of the oil cooler, the by-pass passage being adapted to be opened during warming up to permit a part or whole of the oil discharged from the torque convertor to directly return to the oil tank detouring the oil cooler, so that the heat generated by the torque convertor is efficiently collected to promote the warming up of the automatic transmission.

The above and other objects, features and advantages of the invention will become clear from the following description of the preferred embodiments taken in conjunction with the accompanying drawings.

DESCRIPTION OF THE PREFERRED EMBODIMENTS

Preferred embodiments of the invention will be described hereinunder with reference to the accompanying drawings.

Figure 1:
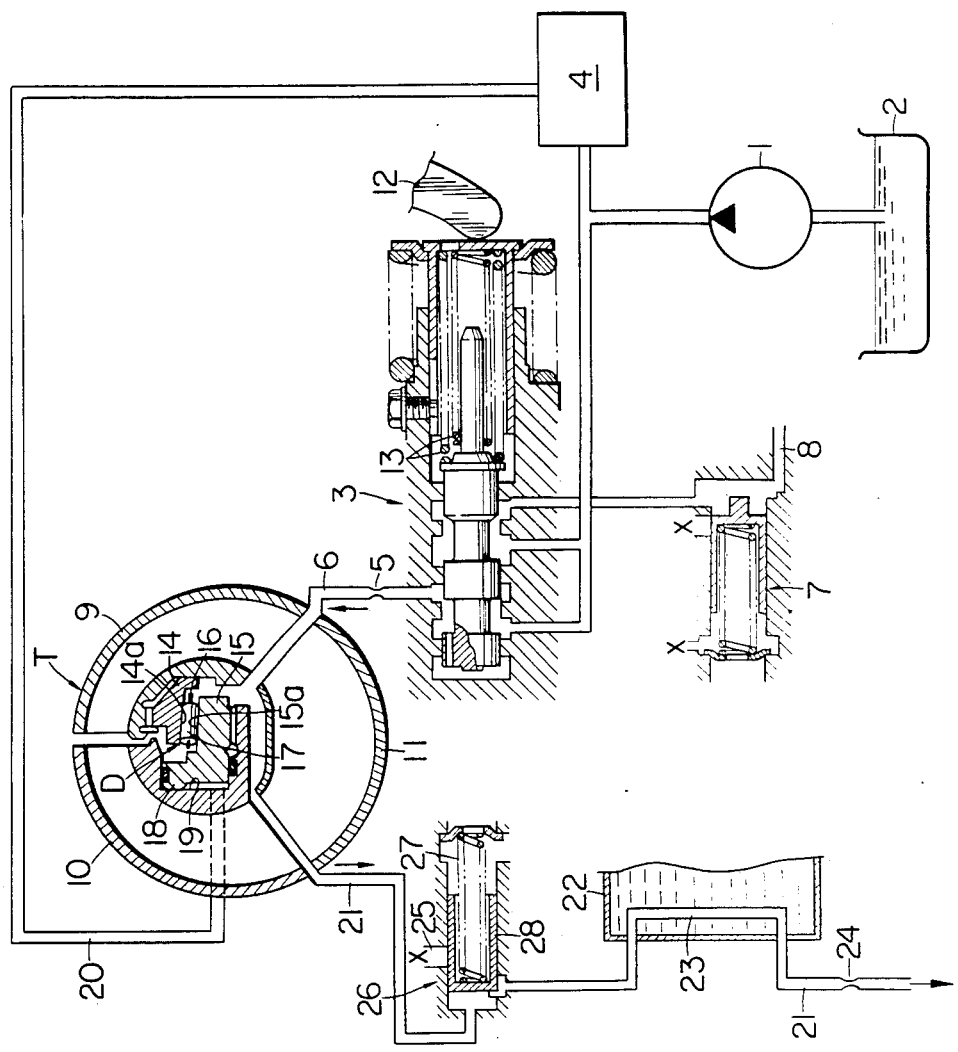
FIG. 1 shows a first embodiment of the invention in vertical section together with the hydraulic circuit thereof.

Referring to FIG. 1 showing a first embodiment of the invention, a hydraulic pump 1 is driven by an engine (not shown) to suck up oil from an oil tank 2 and delivers the oil to a transmission controller 4 after a pressure regulation by a regulator valve 3. This transmission controller 4 is adapted to effect a changing of gears of an auxiliary gear transmission connected to the output side of a torque convertor T which will be explained later. A part of the oil discharged from the hydraulic pump 1 is delivered to the torque convertor T through an oil inlet passage 6 having an orifice 5.

The oil relieved by the regulator valve 3 is sent to various parts of the automatic transmission requiring lubrication, through a passage 8 after a pressure reduction by a pressure regulating valve 7.

The torque convertor T has a pump vane wheel 9 connected to the output shaft (not shown) of the engine, a turbine vane wheel 10 connected to the input shaft (not shown) of the auxiliary gear transmission, and a stator vane wheel 11 disposed between the wheels 9 and 10 and carried through a one-way clutch by the input shaft of the auxiliary gear transmission.

As is well known, the driving torque transmitted from the engine to the pump vane wheel 9 is delivered to the turbine vane wheel 10 fluid-dynamically as is well known. The reaction force caused by any amplification of the torque during the torque transmission between the pump vane wheel 9 and the turbine vane wheel 10 is received by the stator vane wheel 11.

The reaction force of the stator acts on a pressure regulating spring 13 of the regulator valve 3 through an arm 12 so that the line pressure, i.e. the hydraulic pressure for actuating the transmission controller 4, is adjusted in accordance with the reaction force received by the stator vane wheel 11. Therefore, during the amplification of the torque, the line pressure is increased to raise the rate of oil flow into the torque convertor T so that the cooling efficiency of the torque convertor T is increased.

A direct connection mechanism D is disposed between the pump vane wheel 9 and the turbine vane wheel 10. The direct connection mechanism D of the illustrated embodiment has an outer ring 14 fixed to the pump vane wheel 9 and having a conical inner peripheral clutch surface 14a, an inner ring 15 connected axially slidably to the turbine vane wheel 10 and provided with a conical outer peripheral clutch surface 15a for cooperation with the clutch surface 14a, a plurality of clutch rollers disposed between both rings 14,15 and held in the form of a row by a cage 16 at an inclination to the axis of rotation of the torque convertor T, a piston 18 formed on one end of the inner ring 15, and a hydraulic cylinder 19 provided in the turbine vane wheel 10 for receiving the piston 18. This hydraulic cylinder 19 is adapted to be supplied with the line pressure from the transmission controller 4 through a passage 20 under a predetermined condition of operation. When the hydraulic cylinder 19 receives a line pressure higher than the internal pressure of the torque convertor T, the piston 18 is moved to drive the clutch rollers 17 into contact with the clutch surfaces 14a and 15a. The relative rotation between the inner ring 15 and outer ring 14 causes the clutch rollers 17 to move into the radially inner side of the clutch surfaces 14a and 15a so that a torque-transmitting connection is achieved between both clutch surfaces 14a and 15a. In consequence, the torque is mechanically transmitted from the outer ring 14 to the inner ring 15, i.e. from the pump vane wheel 9 to the turbine vane wheel 10. Thus, this direct connection mechanism is of the type in which the connecting force is determined by the difference between the line pressure and the internal pressure of the torque convertor T. When this direct connection mechanism is operating, there is no substantial slip loss in the torque convertor T and, hence, the heat output from the torque convertor T is substantially zero.

The oil outlet passage 21 from the torque convertor T has an oil cooler 23 which is disposed in a radiator 22 of the engine. Namely, the oil discharged from the torque convertor T is directly returned to the oil tank 2 after cooling by the oil cooler 23 or, alternatively, delivered to the parts requiring the lubrication and then returned to the oil tank 2. In the drawings, an orifice 24 represents the resistance to flow of oil incurred in every passages.

The outlet passage 21 is provided with a by-pass passage 25 detouring the oil cooler 23 and leading to the oil tank 2. A by-pass valve 26 is disposed at the juncture of the passages 21 and 25.

The by-pass valve 26 is of a pressure response type having a plunger 28 which receives at its front end the outlet pressure of the torque convertor T and pressed at the rear end thereof by a spring 27. The plunger 28 opens and closes the outlet passage 21 when the discharge pressure of the torque convertor T takes a first set level andopens and closes the by-pass passage 25 when the discharge pressure takes a second set level higher than the first set level. In the drawings, the passages marked with x lead to the oil tank 2.

An explanation will be made hereinunder as to the operation of this embodiment.

Immediately after the start up of the engine in a cold district, the temperature of the cooling water in the radiator 22 is almost at the same level as the ambient air. In addition, the oil in every parts is still cold and exhibits a large viscosity. In consequence, a considerably large pressure drop is produced across the orifice 24 which represents a resistance in every parts of the outlet passage 21. Consequently, the plunger 28 of the by-pass valve 26 is further retracted (rightwardly in the drawings) from the illustrated position so as to suitably open the by-pass valve 25 to relieve a part of oil from the outlet passage 21 of the torque convertor T to the by-pass passage 25. In consequence, the flow rate of the oil through the orifice 24 is decreased. Accordingly, the pressure drop across the orifice 24 is lowered to a level corresponding to the opening degree of the by-pass passage 25. Therefore, provided that the spring constant of the spring 27 in the by-pass valve 26 is selected to be sufficiently low, the pressure drop across the orifice 24 can be maintained substantially constant.

A certain amount of oil flows through the orifice 24 even in this condition, so that no problem is caused in the lubrication even if the oil line is arranged to deliver the oil from the oil cooler 23 to the parts requiring lubrication. In this case, however, the flow rate of oil through the oil cooler 23 is extremely small so that the operation of the oil cooler 23 is materially suspended to promote the warming up.

As the oil temperature rises in accordance with the proceeding of the warming up, viscosity of the oil decreases to reduce the difference of pressure drop between upstream and downstream sides of the throttle valve 24 so that the by-pass valve 26 is gradually moved ahead (to the left as viewed in Figure) so that the opening degree of the by-pass passage 25 decreases to raise the flow rate of the oil cooler 23. Finally, the by-pass oil pasage 25 is closed to permit the whole part of the oil from the torque convertor T to flow through the oil cooler 23.

It is to be noted here that the orifice 24, which is disposed in the automatic transmission, is warmed up rather promptly after the start up of the engine, so that there is a transient period in which the amount of oil to be forced to flow through the orifice 24 is very large. In this transient period, the internal pressure of the torque convertor T will be increased to the same level as the line pressure due to the presence of the orifice 24, if the system lacks the by-pass passage 25. In such a case, in the direct connection mechanism of the illustrated embodiment, the piston 18 is not moved even if the line pressure is introduced into the hydraulic cylinder 19, so that the mechanism D inconveniently fails to provide the direct connection. Therefore, the by-pass passage 25 and the by-pass valve 26 provides an advantage of making sure of the operation of the direct connection mechanism D during warming up operation, in addition to promotion of the warming up.

After the warming up, the engine cooling water in the radiator 22 has been warmed up to a level above a predetermined level and the oil passing through the oil cooler is to be warmed up to exhibit a lower viscosity, so that the pressure drop across the orifice 24 is negligibly small. In consequence, the plunger 28 in the by-pass valve 26 is moved forwardly (to the left as viewed in the drawings) to reduce the opening degree of the by-pass passage 25 to maintain the internal pressure of the torque convertor at a constalt level. It is, therefore, possible to freely control the connecting force in the direct connection mechanism D in response to the hydraulic pressure introduced into the hydraulic cylinder 19. As the engine stops to operate, the plunger 28 of the by-pass valve 26 is further moved forwardly so as to close not only the by-pass passage 25 but also the outlet passage 21 completely, thereby to hold the oil within the torque convertor T.

Figure 2:
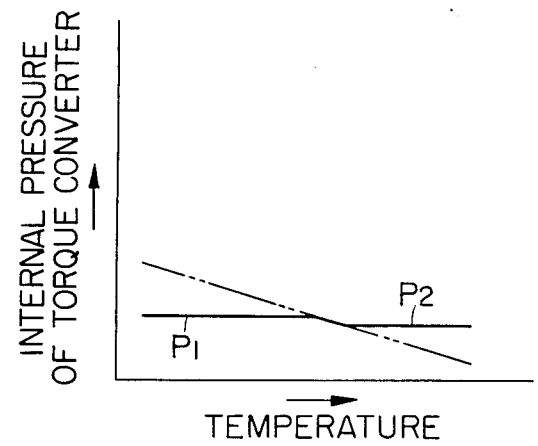
FIG. 2 shows the characteristics of internal pressure of a torque converter incorporated in the first embodiment.

In FIG. 2, the full-line curve shows the change in the internal pressure of the torque convertor T in relation to a change in the temperature, while two-dot-and-dash line curve represents the pressure drop which will occur when there is no provision of the by-pass passage 25. As will be seen from the full-line curve, the step of the pressure level between the internal pressures $P_1$ and $P_2$ of the torque convertor T depends on the spring constant 27 when the by-pass passage 25 is closed. This step height will be made small if the spring constant of the spring 27 is sufficiently low.

Figure 3:
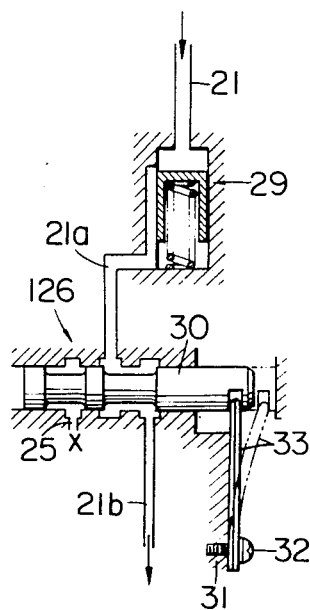
FIG. 3 shows a part of a second embodiment of the invention.

FIG. 3 shows a second embodiment of the invention which is different from the first embodiment in that a temperature-response type by-pass valve 126 is used in place of the pressure-response type by-pass valve 26 incorporated in the first embodiment, and that a check valve 29 is disposed in the outlet passage 21 upstream of the by-pass valve 126. Other portions are materially identical to those in the first embodiment and, hence, are omitted from the drawing. The by-pass valve 126 has a spool 30 which is adapted to bring the upstream side 21a of the outlet passage 21 selectively into communication with the downstream side 21b or the by-pass passage 25. A bimetal 33 is fixed at its base end to the body 31 of the transmission by means of a screw 32 and at its free end to one end of the spool 30. The bimetal 33 may be substituted by a wax-type temperature sensitive member.

When the ambient temperature of the bimetal 33 is rather high, the bimetal 33 takes the position illustrated by full line and drives the spool 30 to the left thereby to keep the outlet passage 21 in the normal state, while closing the by-pass passage 25. However, when the temperature is low, the bimetal 33 is deflected to the position shown by chain line to urge the spool 30 rightwardly thereby to close the downstream side 21b of the outlet passage 21 while bringing the upstream side 21a of the same into communication with the by-pass passage 25. Therefore, during warming up of the transmission, whole part of the oil discharged from the torque convertor T is returned to the oil tank 2 through the by-pass passage 25 and does never flow through the oil cooler 23. It is thus possible to maximize the effect of promotion of the warming up. Then, as the hydraulic pressure in the torque convertor T is decreased after the stopping of the engine, the check valve 29 is closed to prevent escape of the oil from the torque convertor T.

Figure 4:
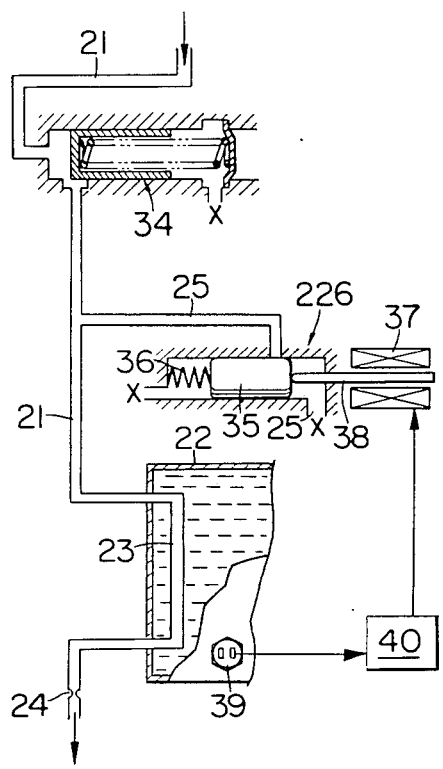
FIG. 4 shows a part of a third embodiment of the invention.

FIG. 4 shows a third embodiment of the invention which is different from the first embodiment in that the by-pass valve 26 in the first embodiment is substituted by a solenoid-actuated by-pass valve 226 disposed in the by-pass passage 25 and that a check valve 34 is disposed in a portion of the outlet passage 21 upstream of the portion where the by-pass passage 25 is branched from the outlet passage 21. Other portions are materially identical to those of the first embodiment and, hence, are omitted from the drawing. The by-pass valve 226 has a plunger 35 adapted to open and close the by-pass passage 25. The plunger 35 is provided at its one end with a spring 36 adapted to urge the plunger 35 in the closing direction. The other end of the plunger 35 is connected to an operation rod 38 adapted to actuate the plunger 35 in the opening direction by the electromagnetic force produced by a solenoid 37. The power supply to the solenoid 37 is controlled by a driving circuit 40 in accordance with a signal derived from a water temperature sensor 39 mounted in the radiator 22.

When the water temperature in the radiator 22 is still lower than a predetermined level, the water temperature sensor 39 produces a signal of low level which makes the driving circuit 40 energize the solenoid 37. In consequence, the plunger 35 is moved to the left by the operation rod 38 thereby to open the by-pass passage 25. Therefore, most part of the oil discharged from the torque convertor T is returned to the oil tank 2 through the by-pass passage 25 detouring the oil cooler 23, due to the flow resistance of the passage 21, that is, the presence of the orifice 24 mentioned before, so that every part of the transmission is warmed up at a greater rate. When the water temperature in the radiator 22 is raised to exceed a predetermined level, the water temperature sensor 39 produces a signal of a high level. Upon receipt of this signal, the driving circuit 40 operates to de-energize the solenoid 37 so that the plunger 35 is moved to the right by the force of the spring 36 thereby to close the by-pass passage 25. The check valve 34 peforms the same function as the check valve 29 of the second embodiment.

Figure 5:
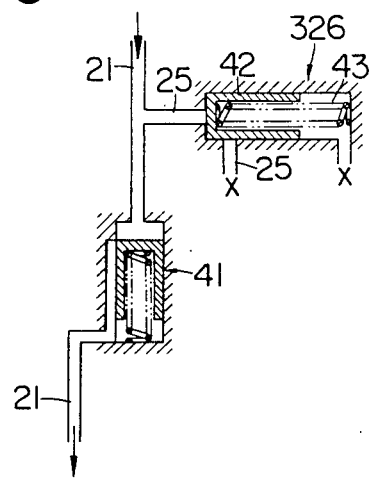
FIG. 5 shows a part of a fourth embodiment of the invention.

FIG. 5 shows a fourth embodiment of the invention, in which a pressure-response type by-pass valve 326 is disposed at an intermediate portion of the by-pass passage 25 and a check valve 41 is disposed at a portion of the outlet pasage 21 downstream of the portion where the by-pass passage 25 is branched from the outlet passage 21. Other portions are materially identical to those in the first embodiment and, hence, are omitted from the drawing. The by-pass valve 326 is provided with a plunger 42 capable of opening and closing the by-pass passage 25. The plunger 42 is urged in the closing direction by a spring 43 the initial load of which is set such that the plunger 42 is moved to open the by-pass passage when the pressure $P_1$ shown in FIG. 2 is reached. The by-pass valve 326 is normally closed. However, when the oil temperature is low, the pressure drop across the orifice 24 in the outlet passage 21 exhibits a large value due to a large oil viscosity. And if the pressure at the inlet to the by-pass passage 25 is increased to exceed the pressure $P_1$, the plunger 42 is moved aback to open the by-pass passage 25. In this case, therefore, it is possible to promote the warming up of every part of the transmission by relieving the most part of the oil from the torque convertor T into the by-pass passage 25.

As has been described, according to the invention, there is provided a warm-up promotion device for automatic transmission having a by-pass passage branched from the outlet passage at a portion upstream of the oil cooler and leading to the oil tank, and a by-pass valve associated with the by-pass passage and adapted to open the by-pass passage during warming up of the automatic transmission.

During the warming up operation, a part or whole of the oil discharged from the torque convertor is returned to the oil tank detouring the oil cooler so that the heat produced by the torque convertor is delivered to the discharged oil and, accordingly, to all parts of the automatic transmission through which the discharged oil is circulated. In consequence, according to the invention, it is possile to remarkably promote the warming up of the transmission to decrease the fuel consumption advantageously.

Although the invention has been described through specific terms, it is to be noted that the described embodiments are not exclusive and various changes and modificatins may be imparted thereto without departing from the scope of the invention which is limited solely by the appended claims.

What is claimed is:

1. In an automatic transmission having a torque convertor, an inlet passage connecting between an oil inlet of said torque convertor and an outlet of a hydraulic pump driven by an engine, and an outlet passage connecting between an oil outlet of said torque convertor and an oil tank, said outlet passage being independent and separate from said inlet passage and being provided at an intermediate portion thereof with an oil cooler, a warm-up promotion device for the automatic transmission, comprising: a by-pass passage branched from said outlet passage at a portion upstream of said oil cooler and leading to said oil tank while bypassing the oil cooler: and a by-pass valve associated with said by-pass passage and adapted to open said by-pass passage during warming up of said automatic transmission; wherein said by-pass valve is a pressure-response type valve which is adapted to open said by-pass passage in response to a pressure rise in said outlet passage caused by an increase in the viscosity of the oil discharged from said torque convertor, thereby allowing the oil to be returned to the tank while bypassing the oil cooler.

2. In an automatic transmission having a torque convertor, an inlet passage connecting between an oil inlet of said torque convertor and and outlet of a hydraulic pump driven by an engine, and an outlet passsage connecting between an oil outlet of said torque convertor and an oil tank, said outlet passage being provided at an intermediate protion thereof with an oil cooler, a warm-up promotion device for the automatic transmission, comprising: a by-pass passage branched from said outlet passage at a portion upstream of said oil cooler and leading to said oil tank while bypassing the oil cooler; and a by-pass valve associated with said by-pass passage and adapted to open said by-pass passage during warming up of said automatic transmission; wherein said by-pass valve is a pressure-response type valve which is adapted to open said by-pass passage in response to a pressure rise in said outlet passage caused by an increase in the viscosity of the oil discharged from said torque convertor, thereby allowing the oil to be returned to the tank while bypassing the oil cooler, said by-pass valve being so constructed as to open and close said outlet passage when the pressure in said outlet passage takes a first set level and to open and close said by-pass passage when said pressure in said outlet passage takes a second set level higher than the first set level.

* * * * *